United States Patent
Rojas et al.

(10) Patent No.: US 7,975,052 B2
(45) Date of Patent: Jul. 5, 2011

(54) NETWORK SWITCH DETERMINING AND NOTIFYING CLIENT IF REQUESTS ASSOCIATED WITH RESTRICTED NETWORK POLICY

(75) Inventors: Bud A. Rojas, Sacramento, CA (US); Shaun Wakumoto, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 231 days.

(21) Appl. No.: 12/361,561

(22) Filed: Jan. 29, 2009

(65) Prior Publication Data

US 2010/0191853 A1 Jul. 29, 2010

(51) Int. Cl.
*G06F 15/173* (2006.01)
(52) U.S. Cl. ......... 709/225; 709/224; 709/223; 709/229
(58) Field of Classification Search .................. 709/223, 709/224, 225, 229, 218, 206, 217, 219
See application file for complete search history.

(56) References Cited

U.S. PATENT DOCUMENTS

| | | | |
|---|---|---|---|
| 2005/0005017 A1* | 1/2005 | Ptacek et al. | 709/229 |
| 2008/0155094 A1* | 6/2008 | Roese et al. | 709/224 |
| 2008/0189393 A1* | 8/2008 | Wagner | 709/218 |
| 2009/0287819 A1* | 11/2009 | Iverson | 709/225 |
| 2009/0307360 A1* | 12/2009 | Ianchici et al. | 709/229 |
| 2010/0082803 A1* | 4/2010 | Nguyen | 709/224 |
| 2010/0121964 A1* | 5/2010 | Rowles et al. | 709/229 |

* cited by examiner

*Primary Examiner* — Le Luu

(57) ABSTRACT

Methods, systems and computer readable mediums storing computer executable programs for managing access to a network at a network access management module are disclosed. A first network request is received from a client at a network access management module. A first determination is made regarding whether the first network request is associated with a restricted network action at the network access management module. A second network request is received from the client at the network access management module. The second network request is intercepted at the network access management module based on the first determination. A network access restriction notification is transmitted from the network access management module to the client based on the first determination.

20 Claims, 5 Drawing Sheets

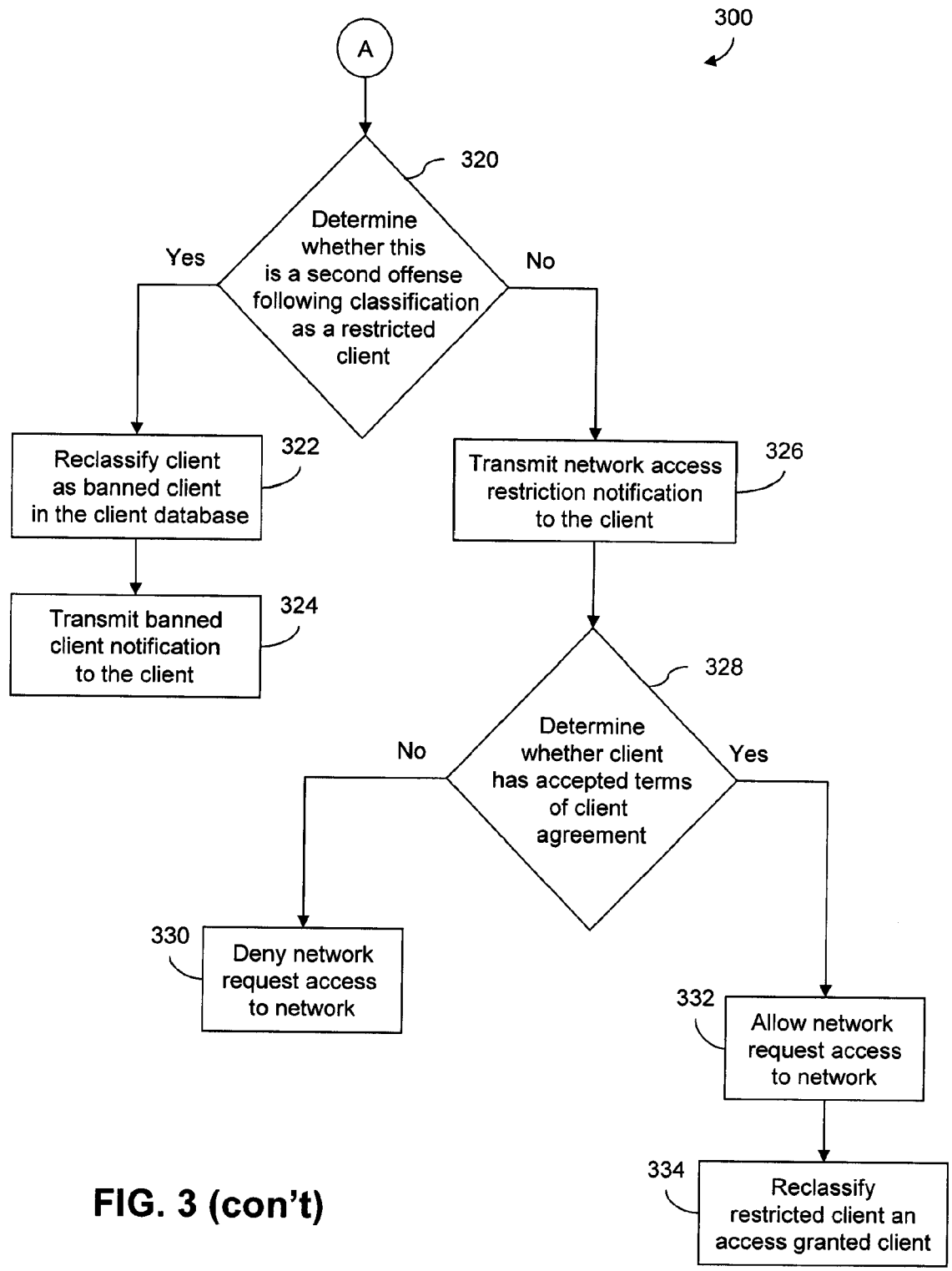
FIG. 3 (con't)

NETWORK SWITCH DETERMINING AND NOTIFYING CLIENT IF REQUESTS ASSOCIATED WITH RESTRICTED NETWORK POLICY

FIELD OF THE INVENTION

The present invention generally relates to network management and more particularly to methods and systems for managing network access.

BACKGROUND OF THE INVENTION

Technological advances have led to the use of increasingly larger and complex networks with an ever increasing number of network systems as an integral part of organizational operations. Users are often provided with access to a network via external network access points to retrieve and/or exchange data with network systems within the network. One example of such an external network access point is a network switch.

In some cases, network users may intentionally or inadvertently submit network requests that are associated with restricted network actions. Examples of such restricted network actions include, but are not limited to, attempts to access restricted network devices including data of a sensitive nature. In other cases, malicious users or hackers may use network requests to attempt to gain access to the sensitive data and/or confidential data stored on restricted access network devices. In some cases, malicious users may use network requests to seek access to the network and/or network devices with the intention of corrupting the network and/or network devices.

Some prior art network systems maintain access control lists that are used to determine whether to allow a user access to the network or deny the user access to the network. Other prior art systems employ firewalls to provide similar functionality. In many cases, no explanation is provided to the user when network access is denied. The user often contacts a network administrator to gain insight into the specific reasons why network access was denied. Such user requests often lead to an increase on the demands made on network administrators to address such requests.

SUMMARY OF THE INVENTION

One aspect of the invention is directed to a method of managing network access at a network switch. A first network request is received from a client at a network access management module. A first determination is made regarding whether the first network request is associated with a restricted network action at the network access management module. A second network request is received from the client at the network access management module. The second network request is intercepted at the network access management module based on the first determination. A network access restriction notification is transmitted from the network access management module to the client based on the first determination.

Another aspect of the invention is directed to a computer readable medium for storing a computer executable program for managing network access at a network switch. Yet another aspect of the invention is directed to a method for managing network access at a network switch.

DETAILED DESCRIPTION OF THE DRAWINGS

Figure 1:
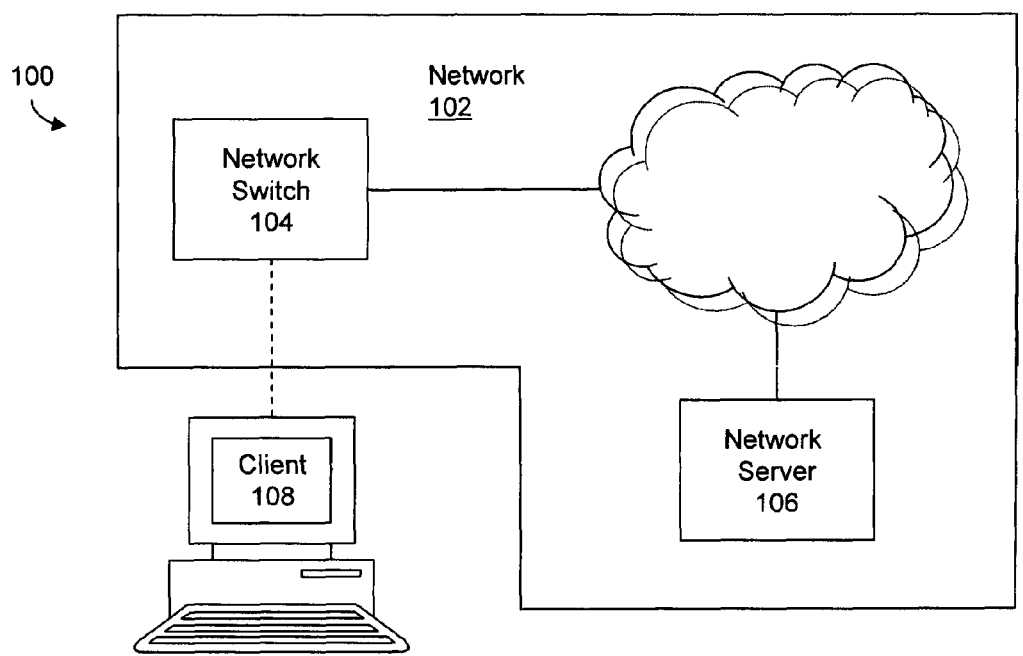
FIG. 1 is a block diagram representation of an example of a network where one embodiment of managing network access at a network switch may be implemented.

Referring to FIG. 1, a block diagram representation of a system 100 that may be used to implement one embodiment of managing network access at a network switch 102 is shown. A network 102 generally includes at least one network switch 104 communicatively coupled to at least one network server 106. In one embodiment, the network switch 104 is an edge interconnect switch. In one embodiment, the network switch 104 includes one or more edge interconnect data ports. A client 108 typically establishes communicatively coupling with the network 102 via an edge interconnect data port on a network switch 104. The network switch 104 generally facilitates communications between the client 108 and a network device within the network 102. Examples of such network devices, include but are not limited to network servers 106. In one embodiment, the client 108 communicates with the network 102 via the Internet.

While a single network switch 104 has been shown, the network 102 may include additional network switches. In one embodiment, the network switch 104 may be integrated another network device. In one embodiment, the functions associated with managing network access described with respect to the network switch 104 may be implement in a network router. In one embodiment, the network router may be integrated another network device. Furthermore, while the network 102 is described as including a single network server 106, the network 102 may include additional network servers. The network 102 includes a plurality of other types of network devices and network systems that are not shown in FIG. 1. Also while a single client 108 is shown communicatively coupled to the network 102, multiple clients 108 may interact with the network 102 at the same time. The illustrated network elements have been selected to support a description an embodiment of managing network access at a network switch 104.

Figure 2:
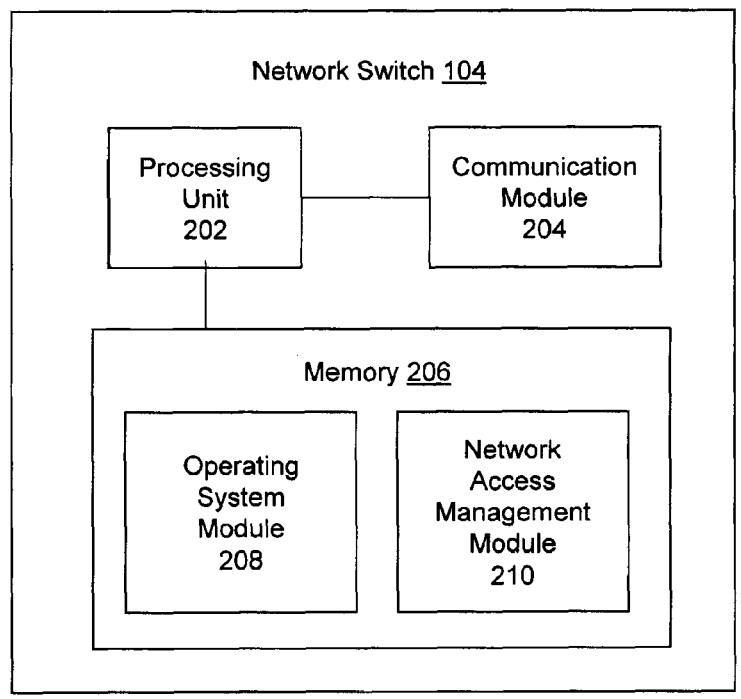
FIG. 2 is a block diagram representation of one embodiment of a network switch.

Referring to FIG. 2, a block diagram representation of one embodiment of a network switch 104 is shown. The network switch 104 generally includes a processing unit 202, a communication module 204 and a memory 206. The processing unit 202 generally includes a processor or controller. In one embodiment, the communication module 204 generally facilitates the exchange of data between the network switch 104 and other network systems. The communication module 204 facilitates the exchange of data between the network switch 104 and the client 108 and between the network switch 104 and the network server 106.

In one embodiment, the communication module 204 supports communication via a networking infrastructure. In one embodiment, the communication module 204 supports communication via the Internet. In one embodiment, the communication module 204 supports communication via an Intranet. In one embodiment, the communication module 204 supports wireless communication. In one embodiment, the communication module 204 supports wired communication. In one embodiment, the communication module 204 supports a combination of wireless and wired communication.

In one embodiment, an operating system module 208 and a network access management module 210 are stored in the memory 206. The network access management module 210 generally manages communications between devices that are external to the network 102 and devices within the network 102. For example, the network access management module 210 manages communications between the client 108 and the network server 106. In one embodiment, the network access management module 210 selectively enables or denies network access by external devices. An example of such an external network device is the client 108. The network access management module 210 provides network access restriction notifications to clients 108 that engage in restricted network actions. Examples of restricted network actions include, but are not limited to, the submission of network requests that seek unauthorized access to network systems that require proper permissions and the submission of network requests that seek to corrupt the network 102 and/or one or more network systems within the network 102.

In one embodiment, the network access management module 210 is a hardware module. In one embodiment, the network access management module 210 is a software module. In one embodiment, the network management module 210 is a combination of hardware and software modules. In one embodiment, a hardware component of the network access management module 210 makes an initial determination regarding whether a request received at the network 102 is allowed access to the network 102.

In one embodiment, the network access restriction notification is a warning issued from the network switch 104 to the client 108 providing a warning to the client 108 that the client 108 has engaged in a restricted network action. In one embodiment, the network access restriction notification includes a description of the specific restricted network action. In one embodiment, the network access restriction notification includes a client agreement that defines acceptable client behavior with respect to interactions with the network 102. The client agreement provides a client 108 with the option of acknowledging acceptance of the terms of the client agreement. The network switch 104 grants a client 108 access to the network 102 upon receipt of the acknowledgement of acceptance of the terms of the client agreement from the client 108. In one embodiment, if the network switch 104 determines that a client 108 has engaged in an unacceptable number of restricted network actions, the network switch 104 issues a network access restriction notification informing the client 108 that the client 108 has been banned from future access to the network 102.

In one embodiment, the network access management module 210 maintains a client database. In one embodiment, the network access management module 210 includes a listing of clients 108 that have engaged in at least one restricted network action. In one embodiment, the network access management module 210 maintains a log associated with each restricted network action in the client database. The log may include one or more of a client identifier, a description of the network restricted action that the client engaged in, the time the restricted network action was detected and a status or classification of the client 108. In one embodiment, the log is exported to a centralized server in the network 102 in order to provide a single point of management for a network administrator.

In one embodiment, each client 108 is classified as either an access granted client or a restricted client. In one embodiment, each client 108 is classified as one of an access granted client, a restricted client and a banned client. In one embodiment, the default classification for a client 108 is an access granted client. An access granted client is generally allowed access to the network 102. In one embodiment, an access granted client is allowed access to selected network systems within the network 102 based on previously granted permissions. A restricted client is temporarily restricted access to the network 102. In one embodiment, an access granted client is reclassified as a restricted client when that client 108 engages in at least one restricted network action. In one embodiment, a restricted client is reclassified as an access granted client upon receipt of an agreement from the client 108 to abide by network access rules.

A banned client is a client 108 that is permanently barred from accessing the network 102. In one embodiment, when a client 108 repeatedly engages in restricted network actions, that client 108 is reclassified as a banned client. In one embodiment, when a client 108 engages in restricted network actions a pre-defined number of times, that client 108 is reclassified as a banned client. In one embodiment, the pre-defined number of times is three times. In one embodiment, failure to agree to abide by network access rules results in the client 108 being reclassified as a banned client.

In one embodiment, the memory 206 includes one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, and flash memory devices. The processing unit 202 generally retrieves and executes machine readable instructions or software programs that are stored in the memory 206.

Figure 3:
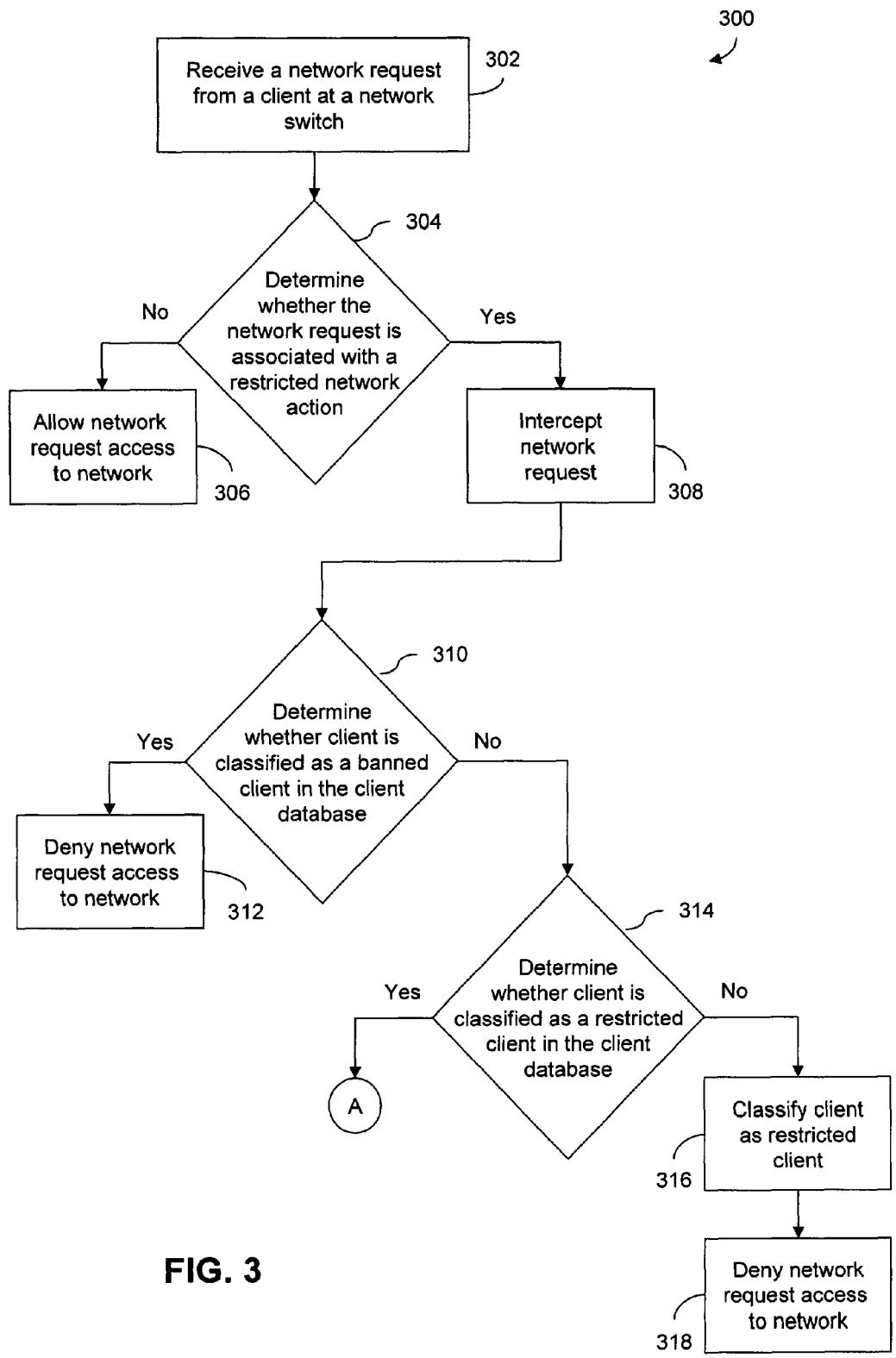
FIG. 3 is a flowchart representation of one embodiment of a method of managing network access at a network switch.

FIG. 3 is a flowchart representation of one embodiment of a method 300 of managing network access at a network switch 104 is shown. A network request is received from a client 108 at a network switch 104 at step 302. The network switch 104 determines whether the received network request is associated with a restricted network action at step 304. Examples of restricted network actions include but are not limited to restricting client access to network servers containing sensitive data and restricting clients from running server applications or peer-to-peer applications.

If the network switch 104 determines that the received network request is not associated with a restricted network action, the network switch 104 allows the network request access to the network 102 at step 306. For example, if a client 108 has issued a network request to the network server 106, the network switch 104 facilitates forwarding of the network request to the network server 106.

If the network switch 104 determines that the network request is associated with a restricted network action, the network switch 104 intercepts the network request at step 308. The network switch 104 determines whether the client 108 has been classified as a banned client at step 310. A banned client is a client 108 that has been permanently barred from accessing the network 102 by the network switch 104. In one embodiment, when a client 108 repeatedly engages in restricted network actions, the network switch 104 classifies that client 108 as a banned client. In one embodiment, when a client 108 fails to agree to abide by network access rules following a violation of network access rules, the network switch 104 classifies that client 108 a banned client.

In one embodiment, the network switch 104 maintains a client database with log entries identifying those clients 108 that have previously engaged in restricted network actions and the current classification of such clients 108. The network switch 104 searches the client database to determine whether the network request was received from a banned client. If the network switch 104 determines that the network request was received from a banned client, the client 108 is denied access to the network 102 at step 312. In other words, the intercepted network request is declined thereby denying network access to the client 108.

If the network switch 104 determines that the client 108 has not been classified a banned client, the network switch 104 determines whether the client 108 has been classified a restricted client at step 314. A restricted client is temporarily restricted access to the network 102 by the network switch 104. In one embodiment, the network switch 104 reclassifies an access granted client as a restricted client the first time that client 108 engages in a restricted network action. The network switch 104 searches the client database to determine whether the network request was received from a restricted client. If the client 108 is classified as a restricted client in the client database, the client 108 has already engaged in a first restricted network action. In one embodiment, a log entry is maintained for every client 108 that has previously committed a restricted network action, including those cases where the client 108 was reclassified as an access granted client following acceptance of the terms of the client agreement. In one embodiment, a client 108 that has been classified as a restricted client multiple times may be classified as a banned client even if the client 108 agrees to the terms of the client agreement.

If the network switch 104 determines that the client 108 is classified an access granted client, in other words, there is no entry in the client database classifying the client 108 as a restricted client, the network switch 102 classifies the client 108 as a restricted client at step 316 and the client 108 is denied access to the network at step 318. In other words, the intercepted network request is declined thereby denying network access to the client 108.

If the network switch 104 determines that the client 108 has been classified as a restricted client, the network switch 104 determines whether this is the second offense for the client 108 as a restricted client at step 320. In other words, following the detection of a first offense, the network switch 104 classifies the client 108 as a restricted client and the client 108 receives an indication that network access has been denied. Upon the detection of a second offense by the client 108 at the network switch 104 (the first offense following classification as a restricted client), the network switch 104 issues a network access restriction notification to the client 108. If the client 108 fails to accept the terms of the client agreement and engages in a third offense (second as a restricted client), the client 108 is banned from access to the network 102.

In one embodiment, the network access restriction notification includes information regarding why the client 108 was blocked and who to contact for further information. In one embodiment, the client 108 receives the network access restriction notification via a user interface that is typically available on personal computers and therefore does not require the installation of additional software on the client 108.

If the network switch 104 determines that this is second offense following classification as a restricted client, the network switch 104 classifies the client 108 as a banned client and updates the client database accordingly at step 322. The network switch 104 transmits a banned client notification to the client 108 at step 324 informing the client 108 that the client 108 has been banned from further access to the network 102. All future network requests received from the banned client at the network switch 104 are intercepted by the network switch 104 and denied access to the network 102.

If the network switch 104 determines that this is a first offense by the client 108 following classification as a restricted client, the network switch 104 transmits a network access restriction notification to the client 108 at step 326. In one embodiment, the network access restriction notification is a warning informing the client 108 that the client 108 has engaged in a restricted network action and includes a description of the specific restricted network action. The network access restriction notification includes a client agreement that defines acceptable client behavior with respect to interactions with the network 102. The transmitted client agreement provides the client 108 with the option of acknowledging acceptance of the terms of the client agreement. At step 328, the network switch 104 determines whether the client 108 has accepted the terms of the client agreement. The network switch 104 grants access to the network 102 again upon receipt of the acknowledgement of acceptance of the client agreement from the client 108.

If the network switch 102 determines that the client 108 has not transmitted an indication of acceptance of the terms of the client agreement back to the network 102, the client 108 is denied access to the network 102 and the intercepted network request is not forwarded to the intended network system within the network 102 at step 330. If the network switch 102 determines that the client 108 has returned an indication of acceptance of the terms of the client agreement to the network 102, the network switch 104 allows the client 108 access to the network 102 and the intercepted network request is forwarded to the intended network system recipient within the network 102 at step 332. The client 108 is reclassified as an access granted client at step 334. While the steps in the method 300 have been described in a particular order, the steps may be performed in a different order. Furthermore, a subset of the described steps and/or additional steps may be performed in addition to the described steps.

In one embodiment, the network switch 104 does not perform the operations associated with banning a client 108 from access to the network 102. If the network switch 104 determines that a network request is associated with a restricted network action, the network switch 104 intercepts the next network request made by the client 108. The network switch 104 generates and forwards a network access restriction notification to the client 108. The network access restriction notification includes information regarding why the client 108 was blocked and who to contact for further information. In one embodiment, the client 108 receives the network access restriction notification via a user interface that is typically available on personal computers and therefore does not require the installation of additional software on the client 108.

Figure 4:
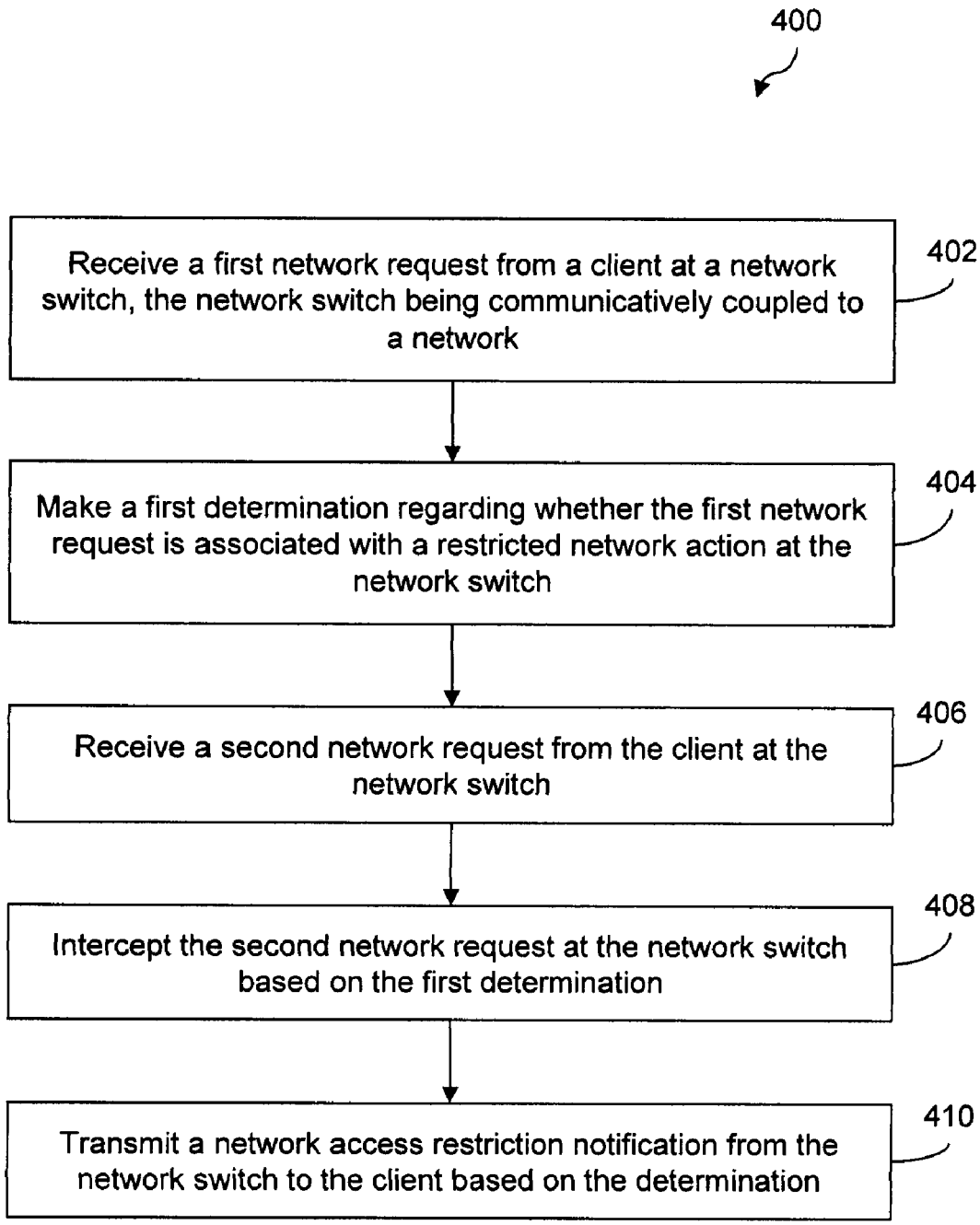
FIG. 4 is a flowchart representation of one embodiment of a method of managing network access at a network switch.

Referring to FIG. 4, a flowchart representation of one embodiment of a method 400 of managing network access at a network switch 104 is shown. At step 402, a first network request is received from a client 108 at a network switch 104 where the network switch 104 is communicatively coupled to a network 102. A first determination is made at step 404 regarding whether the first network request is associated with a restricted network action at the network switch 104. A second network request is received from the client 108 at the network switch 104 at step 406. The second network request is intercepted at the network switch 104 based on the first determination at step 408. A network access restriction notification is transmitted from the network switch 104 to the client 108 based on the first determination at step 410. While the steps in the method 400 have been described in a particular order, the steps may be performed in a different order. Additional steps may be performed in addition to the described steps.

In one embodiment, a computer readable medium stores a computer executable program for managing network access at a network switch 104. The computer readable medium includes computer readable code for receiving a first network request from a client 108 at a network switch 104, the network switch 104 being communicatively coupled to a network 102, computer readable code for making a first determination regarding whether the first network request is associated with a restricted network action at the network switch 104, computer readable code for receiving a second network request from the client 108 at the network switch 104, computer readable code for intercepting the second network request at the network switch 104 based on the first determination, and computer readable code for transmitting a network access restriction notification from the network switch 104 to the client 108 based on the first determination.

Figure 5:
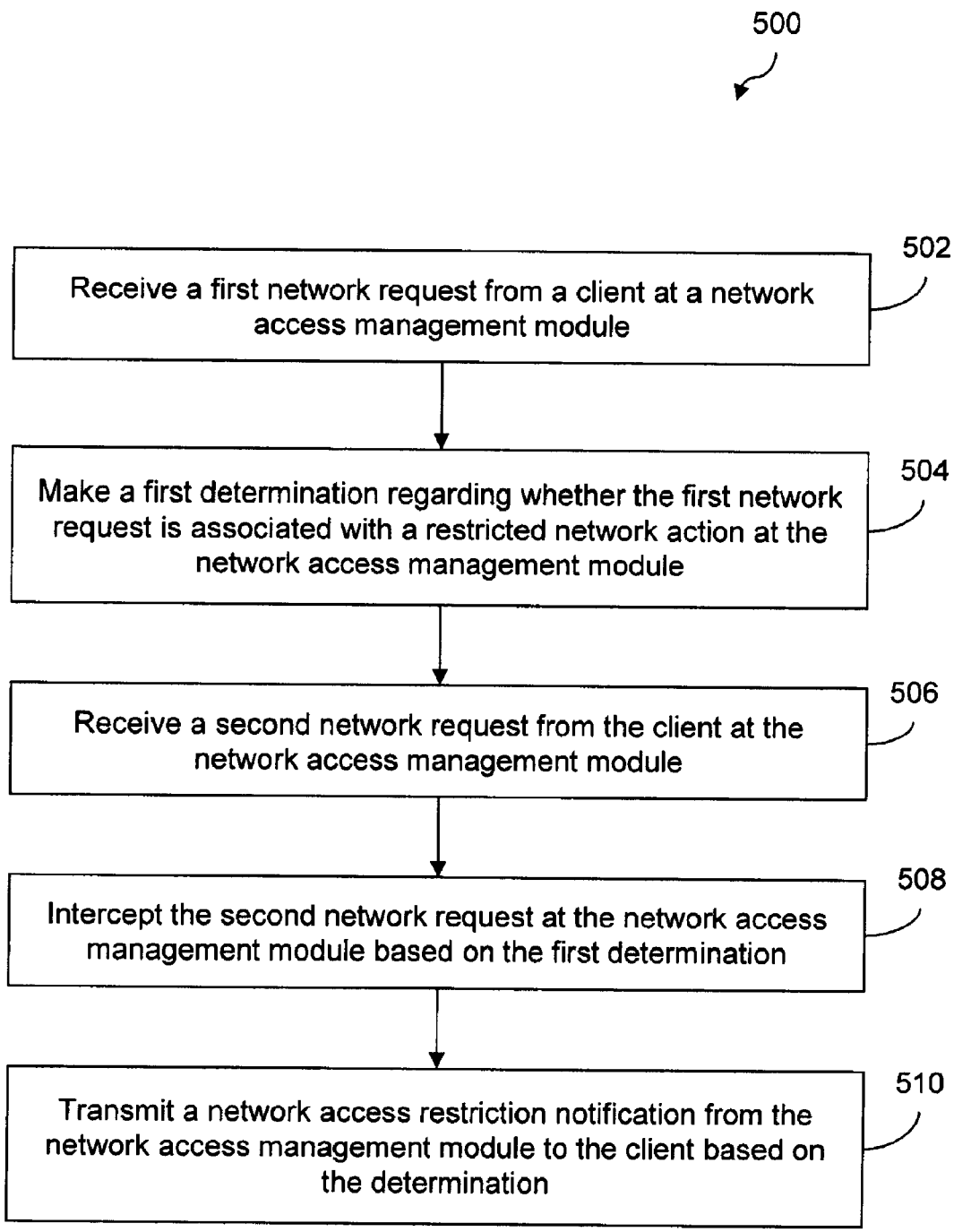
FIG. 5 is a flowchart representation of one embodiment of a method of managing network access at a network access management module.

Referring to FIG. 5, a flowchart representation of one embodiment of a method 500 of managing network access at a network access management module 210 is shown. At step 502, a first network request is received from a client 108 at a network access management module 210. A first determination is made at step 504 regarding whether the first network request is associated with a restricted network action at the network access management module 210. A second network request is received from the client 108 at the network access management module 210 at step 506. The second network request is intercepted at the network access management module 210 based on the first determination at step 508. A network access restriction notification is transmitted from the network access management module 210 to the client 108 based on the first determination at step 510. In one embodiment, the network access management module 210 is a component of a network switch 104. In one embodiment, the network access management module 210 is a component of a network router. While the steps in the method 500 have been described in a particular order, the steps may be performed in a different order. Additional steps may be performed in addition to the described steps.

It should be noted that while systems implemented using software or firmware executed by hardware have been described above, those having ordinary skill in the art will readily recognize that the disclosed systems could be implemented exclusively in hardware through the use of one or more custom circuits, such as for example, application-specific integrated circuits (ASICs) or any other suitable combination of hardware and/or software.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. A method of managing network access at a network switch, the method comprising:
    receiving a first network request from a client at a network switch, the network switch being communicatively coupled to a network;
    making a first determination regarding whether the first network request is associated with a restricted network action at the network switch;
    receiving a second network request from the client at the network switch;
    intercepting the second network request at the network switch based on the first determination; and
    transmitting a network access restriction notification from the network switch to the client based on the first determination.

2. The method of claim 1, further comprising establishing a communication channel between the client and the network switch via the Internet.

3. The method of claim 1, further comprising
    classifying the client as a restricted client based on the first determination; and
    maintaining a log on the restricted client and associated restricted network action in a client database.

4. The method of claim 3, further comprising making a second determination regarding whether the second network request is received from a client classified as a restricted client in the client database, wherein intercepting the second network request at the network switch and transmitting a network access restriction notification from the network switch to the client is based on the second determination.

5. The method of claim 1, wherein transmitting a network access restriction notification comprises transmitting a warning notification.

6. The method of claim 1, wherein transmitting a network access restriction notification comprises transmitting a description of the restricted network action.

7. The method of claim 1, wherein transmitting a network access restriction notification comprises transmitting a request for acknowledgement of acceptance of a client agreement to the client, the client agreement defining acceptable client behavior involving interactions with the network.

8. The method of claim 7, further comprising allowing the second network request access to the network upon receipt of acknowledgement of acceptance of the client agreement from the client at the network switch.

9. The method of claim 7, further comprising:
classifying the client as a restricted client based on the first determination;
removing classification of the client as a restricted client upon receipt of acknowledgement of acceptance of the client agreement from the client at the network switch.

10. A non-transitory computer readable medium for storing a computer executable program for managing network access at a network switch, the computer readable medium comprising:
computer readable code for receiving a first network request from a client at a network switch, the network switch being communicatively coupled to a network;
computer readable code for making a first determination regarding whether the first network request is associated with a restricted network action at the network switch;
computer readable code for receiving a second network request from the client at the network switch;
computer readable code for intercepting the second network request at the network switch based on the first determination; and
computer readable code for transmitting a network access restriction notification from the network switch to the client based on the first determination.

11. The non-transitory computer readable medium of claim 10, further comprising computer readable code for establishing a communication channel between the client and the network switch via the Internet.

12. The non-transitory computer readable medium of claim 10, further comprising
computer readable code for classifying the client as a restricted client based on the first determination; and
computer readable code for maintaining a log on the restricted client and associated restricted network action in a client database.

13. The non-transitory computer readable medium of claim 12, further comprising computer readable code for making a second determination regarding whether the second network request is received from a client classified as a restricted client in the client database,
wherein the computer readable code for intercepting the second network request at the network switch comprises computer readable code for intercepting the second network request at the network switch based on the second determination, and
wherein the computer readable code for transmitting a network access restriction notification from the network switch to the client comprises computer readable code for transmitting a network access restriction notification from the network switch to the client based on the second determination.

14. The non-transitory computer readable medium of claim 10, wherein the computer readable code for transmitting a network access restriction notification comprises computer readable code for transmitting a warning notification.

15. The non-transitory computer readable medium of claim 10, wherein the computer readable code for transmitting a network access restriction notification comprises computer readable code for transmitting a description of the restricted network action.

16. The non-transitory computer readable medium of claim 10, wherein the computer readable code for transmitting a network access restriction notification comprises computer readable code for transmitting a request for acknowledgement of acceptance of a client agreement to the client, the client agreement defining acceptable client behavior involving interactions with the network.

17. The non-transitory computer readable medium of claim 16, further comprising computer readable code for allowing the second network request access to the network upon receipt of acknowledgement of acceptance of the client agreement from the client at the network switch.

18. The non-transitory computer readable medium of claim 16, further comprising:
computer readable code for classifying the client as a restricted client based on the first determination;
computer readable code for removing classification of the client as a restricted client upon receipt of acknowledgement of acceptance of the client agreement from the client at the network switch.

19. A method of managing network access at a network access management module, the method comprising:
controlling the network access management module with a processing unit by:
receiving a first network request from a client at the network access management module;
making a first determination regarding whether the first network request is associated with a restricted network action at the network access management module;
receiving a second network request from the client at the network access management module;
intercepting the second network request at the network access management module based on the first determination; and
transmitting a network access restriction notification from the network access management module to the client based on the first determination.

20. The method of claim 19, providing the network access management module as a component of one of a network switch and a network router.

\* \* \* \* \*